United States Patent Office 3,311,420
Patented Mar. 28, 1967

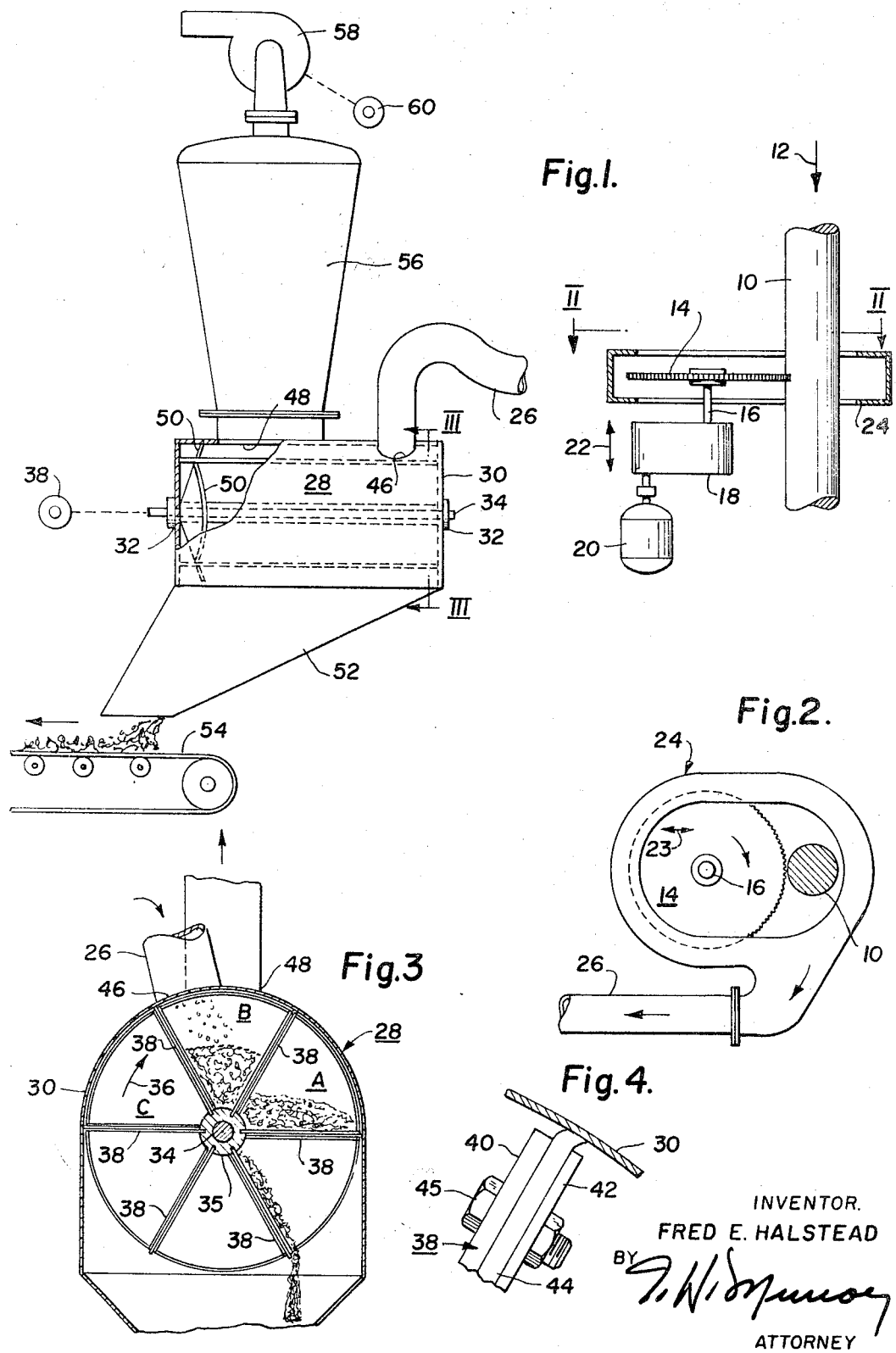

3,311,420
VACUUM CLEANING APPARATUS FOR PARTICULATE MATERIALS
Fred E. Halstead, Rochester, Pa., assignor to Halstead Metal Products, Inc., Zelienople, Pa., a corporation of Pennsylvania
Filed June 7, 1965, Ser. No. 461,722
3 Claims. (Cl. 302—49)

This invention relates to specialized vacuum cleaning apparatus, and more particularly to vacuum conveying and collecting apparatus for relatively heavy particulate materials such as metal chips produced in a metalworking process.

While not limited thereto, the present invention is particularly adapted for use in a metal sawing operation wherein it is necessary to provide a means for continuously removing from the sawing location large quantities of chips which would otherwise rapidly collect around the saw and eventually interfere with its operation. In the case of metals such as copper, these chips are collected and remelted so that it becomes desirable to automatically convey them from the sawing area to a bin or the like where they can be processed for remelting with as little contamination as possible.

Accordingly, as an overall object, the present invention seeks to provide apparatus for automatically conveying chips from a metalworking operation to a bin by means of pneumatic conveying apparatus which operates on somewhat the same principle as a conventional vacuum sweeper. That is, the chips are collected by means of suction created in a conduit and thereafter deposited in a chip collecting device. Here, however, the similarity to a vacuum sweeper ends. In most vacuum sweepers, the dirt or other particulate material enters an intake, passes through the rotating blades of a suction fan, and thence into a collecting bag. Such an arrangement would be entirely unsatisfactory for metal chips since (1) the chips would damage the blades of the fan and (2) a collecting bag cannot handle large amounts of material, at least not on a continuous basis.

In accordance with the present invention, a vacuum cleaning and/or conveying system for metal chips is provided wherein the chips enter an intake end of a passageway having a suction fan at the other end, and wherein chip collecting and discharging means are provided intermediate the intake and suction fan. In this manner, the chips are collected and discharged from the system without passing through the fan blades.

Preferably, the chip collecting means comprises a generally cylindrical housing having openings in its top portion which communicate with the intake and suction fan, respectively. Extending through the housing is a rotatable axle which carries a plurality of circumferentially spaced and radially extending staves to form with the housing a plurality of chambers, each defining a generally V-shaped configuration. As the axle rotates, successive ones of the chambers will move into position to receive chips or other particulate material from the intake end of the aforesaid passageway. Thus, a mixture of high velocity air and particulate material will pass into the aforesaid cylindrical housing; the major portion of the particulate material will be deposited in one of the aforesaid V-shaped chambers due to a decrease in the velocity of the air stream within the housing; and the air will thereafter pass out of the housing to the suction fan. An opening is provided in the bottom of the cylindrical housing such that as each successive V-shaped chamber rotates downwardly, the chips which it has collected will fall into a bin or the like.

In order to insure that chips will not pass from the collecting chamber to the suction fan, the outlet from the collecting chamber is through a vertical conduit having an enlarged cross-sectional area forming an expansion chamber wherein the velocity of the air stream again decreases. Hence, if any chips should initially pass through a V-shaped chamber without being deposited therein, they will fall downwardly under the force of gravity in the aforesaid expansion chamber due to the decrease in air velocity and will be prevented from passing through the blades of the suction fan.

The above and other objects and features of the invention will become apparent from the following detailed description taken in connection with the accompanying drawings which form a part of this specification, and in which:

FIGURE 1 is an elevational side view of the vacuum cleaning and conveying apparatus of the invention;

FIG. 2 is a top view of the sawing mechanism and chip collecting device taken substantially along line II—II of FIG. 1;

FIG. 3 is a cross-sectional view of the chip collecting and discharging apparatus of the invention, taken substantially along line III—III of FIG. 1; and FIG. 4 is a broken away view of an end of one of the staves of the chip collecting and discharging apparatus.

With reference now to the drawings, and particularly to FIGS. 1 and 2, a workpiece to be cut is indicated generally by the reference numeral 10 and may comprise, for example, a billet 10 produced in a continuous casting process and traveling downwardly along the direction of arrow 12. As will be understood, it is necessary to cut a workpiece, such as billet 10, into lengths for further processing. Accordingly, a saw blade 14 is provided for this purpose. The blade 14 is connected through shaft 16 to a gear reducer 18, the shaft 16 being connected through the gearing within reducer 18 to a drive motor 20. The entire assembly of elements 14, 16, 18 and 20 is reciprocable by means, not shown, along the direction of arrow 22 in order that it can move with the billet 10 during a cutting operation and thereafter retract upwardly preparatory to a succeeding cutting operation. Also, the saw can reciprocate at right angles to arrow 22 (i.e., arrow 23 in FIG. 2) to effect a cutting operation.

Surrounding the saw 14 and billet 10, as best shown in FIG. 2, is shield means comprising an annular channel 24 which acts to collect metal chips produced during a sawing operation. Connected to the channel 24, at one point around its periphery, is a flexible conduit 26 which, in turn, leads to the chip collecting apparatus of the invention, generally indicated by the reference numeral 28.

With specific reference, now, to FIGS. 1 and 3, the chip collecting apparatus of the invention comprises a generally semicylindrical housing 30 having bearing plates 32 at its opposite ends which carry a rotatable axle 34. The axle 34 is continually driven in one direction (i.e. in the direction of arrow 36 in FIG. 3) by means of a drive motor, schematically illustrated at 38 in FIG. 1. Carried on the shaft 34 is a slotted cylinder 35. Carried within the slots of cylinder 35 and circumferentially spaced therearound are six staves 38. Each stave comprises a pair of plates 40 and 42 (FIGS. 3 and 4) which carry therebetween a rubber plate 44, the assembly being held together by bolts 45. As shown in FIG. 4, the rubber plate 44 projects beyond the ends of the plates 40 and 42 and provides a wiping seal which contacts the inner periphery of the semicylindrical housing 30 as the axle 34 rotates. In this manner, successive chambers A, B and C, for example, are formed between the inner periphery of the housing 30 and the staves 38 as the axle 34 rotates.

Provided in the top of the housing 30 is an inlet opening 46 for chips in fluid suspension passing through conduit 26. An outlet opening 48 is also provided in the top of the housing 28; and the inlet and outlet openings 46 and 48, respectively, are so positioned that they communicate with the same chamber A, B or C at any one time. At one end of each chamber, as best shown in FIG. 1, is a baffle 50 which serves a purpose which will hereinafter be explained.

The underside of the housing 28, is open and it is connected through a chute 52 to a conveyor belt 54 which conveys chips produced during a sawing operation to a remote location for further processing.

The outlet opening 48 in the housing 30 is connected through an enlarged diameter portion 56 to a blower 58 connected to a drive motor 60. With the arrangement shown, and assuming that the blower 58 is being driven by motor 60 and that axle 34 is rotated by motor 38, the blower 58 will create a suction, thereby causing the chips produced during the sawing operation to flow through conduit 26 and into the housing 28 through inlet opening 46. The chips will enter one of the chambers, such as chamber A, B or C, for example, and will be, for the most part, deposited in that chamber while the air stream will pass upwardly through the enlarged diameter section 56. Baffles 50 prevent the chips from being blasted against the left end of the housing 28 as shown in FIG. 1. While the major portion of the chips will drop into an associated one of the chambers A, B or C in passing through the housing 28, a minor portion will attempt to move upwardly and out of the outlet opening 48. These chips must be prevented from entering the blades of blower 58; and, accordingly, the expansion chamber 56 is provided which causes a decrease in the velocity of the air stream. This decrease in velocity is such that it will not support the weight of the chips in fluid suspension. Accordingly, any chips which might pass through an associated one of the chambers A, B or C will never reach the blower 58 because of the decrease in velocity of the air stream effected by the enlarged diameter section 56.

As was mentioned above, the axle 34 will be continually rotated by drive motor 38. Consequently, a new chamber will be periodically presented to the incoming chips from conduit 26 while the preceding chamber, as shown in FIG. 3, will begin to move downwardly until the chips stored therein are discharged through the chute 52 and onto the conveyor 54.

It can thus be seen that the present invention provides a means for continually removing large amounts of metal chips from a metalworking operation in a simple and economical manner. Although the invention has been shown and described in connection with a certain specific embodiment, it will be readily apparent to those skilled in the art that various changes in form and arrangement of parts may be made to suit requirements without departing from the spirit and scope of the invention.

I claim as my invention:

1. A vacuum cleaning apparatus for metal chips produced by a metalworking tool comprising shield means surrounding at least a portion of said tool and adapted to receive metal chips produced by said tool, a generally cylindrical housing, a rotatable axle extending axially through the housing, a plurality of radially extending staves circumferentially spaced around said axle and forming with the housing a plurality of chambers, sealing flaps along the edges of the staves, an opening in the bottom of said housing through which metal chips in successive ones of said chambers may be discharged, a first conduit having one end connected to a first opening in the top portion of said housing at one end of the housing and another end connected to said shield means and acting as an intake for metal chips, a second conduit having one end connected to a second opening in the top portion of said housing at the other end of the housing, the first and second openings in the housing being located to both communicate with the same successive ones of said chambers as the axle rotates, baffle means at an end of each of said chambers and against which metal chips impinge, said baffle means being at the ends of the chambers opposite the ends of the chambers which communicate with said first opening, and a blower connected to the other end of said second conduit and arranged to suck air and metal chips through said first opening and into successive ones of said chambers as the axle rotates, the metal chips being retained within successive chambers and thereafter discharged through said opening in the bottom of the chamber while air substantially free of metal chips passes through said second conduit to said blower.

2. The vacuum cleaning apparatus of claim 1 wherein said second conduit extends vertically upwardly from said housing and is provided with an enlarged cross-sectional area portion for reducing the velocity of the air therein, whereby metal chips which pass through said housing will, because of the reduction in velocity, fall downwardly from the enlarged cross-sectional area portion back into the housing without passing to the blower.

3. The vacuum cleaning apparatus of claim 1 including motor means for continuously rotating said axle and the staves carried thereby.

References Cited by the Examiner

UNITED STATES PATENTS

| 2,917,344 | 12/1959 | Futty | 302—59 |
| 2,946,626 | 7/1960 | Atkinson et al. | 302—59 |

FOREIGN PATENTS

| 1,170,320 | 5/1964 | Germany. |
| 302,412 | 12/1928 | Great Britain. |

ANDRES H. NIELSEN, *Primary Examiner.*